UNITED STATES PATENT OFFICE.

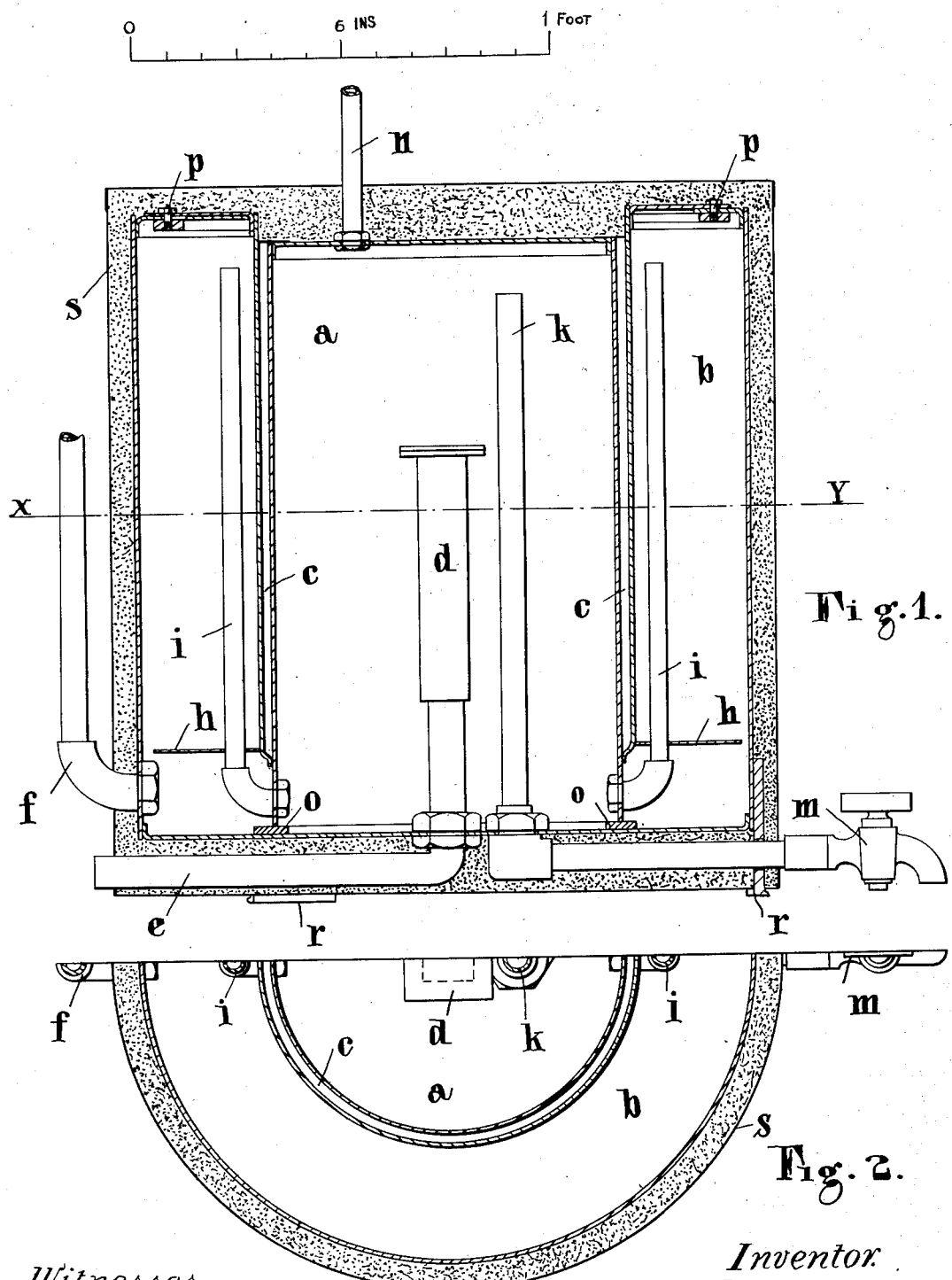

WILLIAM RANSON COOPER, OF LONDON, ENGLAND.

HEATER.

1,047,389. Specification of Letters Patent. Patented Dec. 17, 1912.

Application filed March 11, 1912. Serial No. 682,979.

*To all whom it may concern:*

Be it known that I, WILLIAM RANSON COOPER, a subject of the King of Great Britain and Ireland, and residing at 113 Tulse Hill, London, S. W., England, have invented a certain new and useful Heater, of which the following is a specification.

The invention relates to heaters for water or other liquids and especially to those of the domestic type.

Hitherto difficulty has been experienced in providing hot water for domestic purposes by appliances attached to the water supply (as distinct from boilers attached to kitchen ranges or plant of that kind) because the water is only required intermittently, and when it is required it must be heated up rapidly during its passage through the apparatus. Consequently if such heating is effected electrically by an electric " geyser " the power required may be so large as to cause a load that is undesirable for the wiring and may cause the charge for energy on certain tariffs to be high. Similarly, if a gas " geyser " is used the apparatus has to be of considerable size in order that the heat shall be absorbed quickly enough of the water in passing.

The first difficulty mentioned above may be overcome to some extent if a relatively large volume of water is heated by a small power continuously applied. Heat is thus stored in the water, and if a certain part of the water is drawn off, the remainder, notwithstanding the inflow of cold water, is still more or less hot. The disadvantage however of heating water in this way in an ordinary container is that a long interval must elapse, in starting from the cold state, before any hot water can be drawn off, because a large proportion of this water has to be heated to the required temperature before any is available at that temperature.

A long interval must also elapse after the temperature has been lowered by drawing water before the previous temperature is again reached, and this time must elapse before even a small quantity of water can be drawn at the former temperature. This difficulty occurs in both large and small water heaters unless a comparatively large power is applied at intervals when the temperature is lowered, but there are objections to employing large powers intermittently as already pointed out.

To overcome such difficulties proposals have been made to utilize a mass of metal as a means for absorbing and storing heat from a continuously-acting electric heater; in such a case the apparatus as a whole contained only a small quantity of water, the water required being heated on its passage through the apparatus in a manner approximating to that employed in an ordinary gas geyser.

The object of my invention is to deal with a comparatively large quantity of water in the apparatus and to use the water itself as a store of heat, but at the same time to provide a certain proportion of the whole at a suitable temperature for immediate domestic use.

To this end I utilize a container comprising a number of vessels surrounding one another. The innermost vessel is of such a capacity as to contain a suitable quantity of water, this quantity depending upon the rate at which hot water is required, and also contains the heating element properly protected from the water, which water therefore becomes rapidly heated in this compartment. The innermost vessel is surrounded by one or more other vessels each containing water and communicating with each other as hereafter described so that each vessel is jacketed more or less completely by the next larger vessel. Thus if the innermost vessel is a vertical cylinder, the one or more outer vessels are conveniently made cylinders also, co-axial with the first. As the water in the center cylinder becomes heated, the heat will flow through the walls of this vessel and heat the water in the second cylinder; and heat from the water in the second cylinder will flow to the third cylinder, and so on. The warmed water will collect at the top of any cylinder, and in order to enable water to be drawn from those parts where it is warmest, the outflow pipe is fitted so as to draw water from the top of the center vessel. The latter is so connected to the second vessel as to draw water from the top of the second vessel and this water is supplied to the bottom of the center vessel; similarly water is supplied to the bottom of the second vessel from the top of the third vessel and so on. The supply of cold water is led in at the bottom of the outermost vessel.

The steady temperature of the water in each compartment will depend upon the rate at which heat is supplied to the heater, upon the rate at which heat flows through the walls of each compartment and upon the rate of heat loss from the outer surface of the apparatus. When a steady condition is reached the heat radiated will be practically equal to the heat supplied if care is taken to avoid loss by conduction.

In any case the flow of heat from the center compartment will depend upon the heat conductivity of the walls of this compartment, these walls separating the water within from that in the next jacketing compartment, and if the water in the center compartment is to rise to a temperature suitable for domestic use in a reasonable time this heat conductivity must not be too high. If the vessels are made of metal, as would generally be the case, I find that the conductivity of sheet metal is too high. It is therefore necessary to introduce some heat insulating body between the water in the center compartment and that in the next compartment. I find that a convenient method of doing this is to surround the center vessel by an air jacket which separates it entirely or largely from the walls of the next compartment. In that case the heat from the hot water in the center compartment has to traverse this air as well as the walls of the two compartments before reaching the water in the second compartment, and consequently the water in the center compartment reaches a higher temperature than it would otherwise with the same supply of power and does so more quickly.

A convenient heater for small quantities of water can be made with one center compartment surrounded by a single water jacket as described. Such a form of the invention is illustrated by way of example in the accompanying drawings, the apparatus shown being designed for a capacity of say 15 gallons and 275 watts.

Figure 1 shows a sectional elevation, while Fig. 2 is a cross section on the line X Y of Fig. 1.

Thus the center cylindrical container, $a$, is surrounded by a second annular container or jacket, $b$, the two vessels being separated by the air space, $c$.

The heater proper which may consist of any suitable arrangement of resistances is inclosed in the water-tight container, $d$, the leads to the heater passing thereto by way of the pipe; $e$. The cold water supply enters the lower part of the annular container, $b$, through the pipe, $f$, a baffle plate, $h$, being arranged as shown to prevent as far as possible disturbance of the warmer water above. From the lower part of the central container, $a$, pipes, $i, i$, lead to the upper part of the water space of the annular chamber while finally the hot water is withdrawn from the upper part of the central chamber by way of the pipe, $k$, controlled by the tap, $m$. A relief pipe, $n$, should be provided at the upper part of the central chamber. The inner container may be bedded on a leather ring, $o$, and secured by the bolts, $p$, while the whole apparatus may be provided with feet, $r$, and be surrounded with lagging $s$ contained in a bright sheet metal casing.

The extent to which one compartment is completely jacketed by another is a matter that is governed by the cost of construction, complete jacketing not being essential.

In some cases a water tank such as is usually employed for giving a household supply may be modified by inserting a metal bell in it, the bottom of the bell resting on the bottom of the tank and the surface of the bell being air-jacketed as far as is necessary. Such a bell might take the form of the inner container shown, the bolts, $p$, being removed and the container withdrawn bodily. This bell would contain the heater proper. The hot water would be drawn from within the bell from the top layers of water, and the colder water would be admitted near the bottom of the bell from the surrounding water in the tank, preferably from the upper warmer layers.

In all cases the principle involved is the heating of a comparatively small body of water (or only a portion of the water in the whole apparatus), this water in turn transmitting heat to a water jacket or jackets, and the container for this small body of water being so made that heat is not readily transmitted, and that the water is therefore raised to a suitable temperature more quickly than it would be otherwise, and thus quickly forms a reserve on which to draw.

To secure the results aimed at, therefore, the heat insulation of the inner container should not be carried beyond a comparatively moderate degree.

The power applied for heating may be so adjusted once for all that when a steady temperature condition is reached the loss by radiation and conduction is equal to the power supplied without causing the water to boil.

The principle explained above as underlying the present invention may be applied to other forms of apparatus than those described while in some cases gas may be used as the heating agent.

Having now described my invention, what I claim as new and desire to secure by Letters Patent is:—

1. In combination a plurality of concentric water vessels with duct means therebetween connecting said vessels in series; a water inlet at the bottom of the outermost of said vessels; a water outlet from the top of the innermost of said vessels, together with heating means and a container inclosing the same, said container being small in relation to the volume of heat-storage water in the said innermost vessel and immersed therein.

2. In combination a plurality of concentric water vessels with duct means therebetween connecting said vessels in series; a water inlet to the bottom of the outer of said vessels; a baffle in said vessel adjacent to said inlet; a water outlet from the top of the innermost of said vessels, together with heating means and a container inclosing same, said container being small in relation to the volume of heat-storage in said innermost vessel and immersed therein.

3. In combination a plurality of interconnected water vessels separated by insulating air isolated from the interior of said vessels, together with means for heating water in the innermost of said vessels.

4. An electric water heater, comprising in combination a plurality of concentric cylindrical water vessels with open duct means therebetween connecting said vessels in series; an inlet to an outer vessel; an outlet from the innermost of said vessels, together with electric heating means and a container inclosing the same, said container being small in relation to the volume of heat-storage water in said innermost vessel and immersed therein.

5. In combination, a plurality of concentric water vessels; a water inlet pipe to the bottom of an outer vessel; a pipe in said vessel with an open end near the top and connected to the lower part of the innermost vessel; a pipe in said innermost vessel having an open end near the top and a water outlet near the bottom together with heating means and a container inclosing the same, said container being small in relation to the volume of heat-storage water in said innermost vessel and immersed therein.

In testimony whereof I have signed my name to this specification in the presence of two subscribing witnesses.

WILLIAM RANSON COOPER.

Witnesses:
F. W. HEWITT,
E. L. BILLINGTON.